(No Model.)
H. C. STIFEL.
WATER CLOSET.
No. 516,131.  
2 Sheets—Sheet 1.  
Patented Mar. 6, 1894.
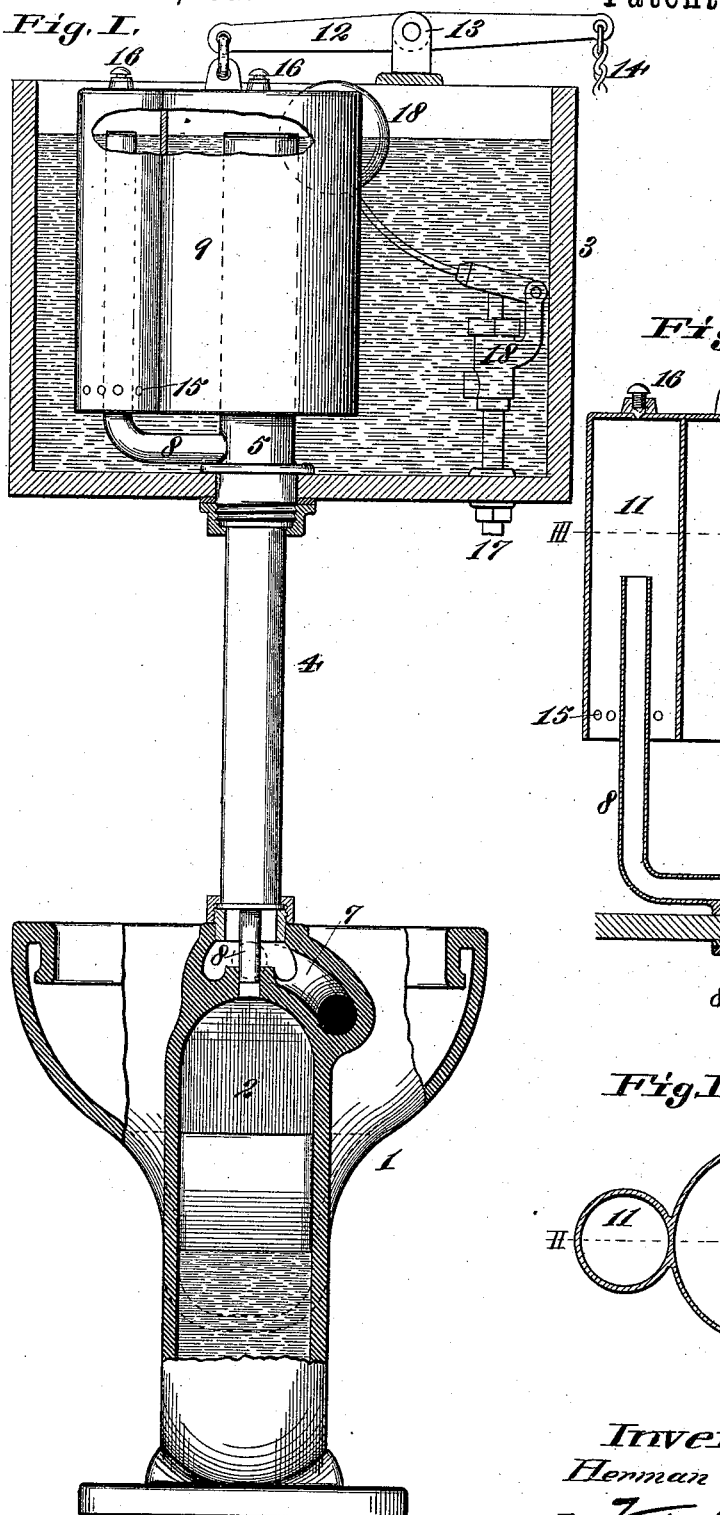
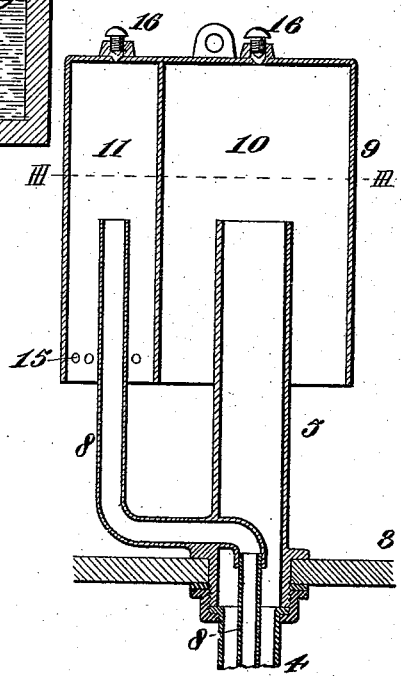
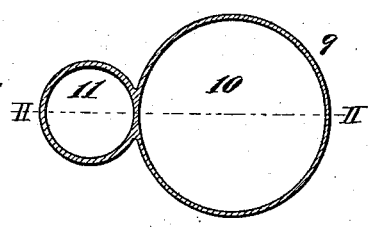
Inventor,  
Herman C. Stifel  
By Knight Bros  
Atty's
Attest:  
E. Knight  
Benj. A. Knight (No Model.)
2 Sheets—Sheet 2.
H. C. STIFEL.
WATER CLOSET.
No. 516,131.
Patented Mar. 6, 1894.
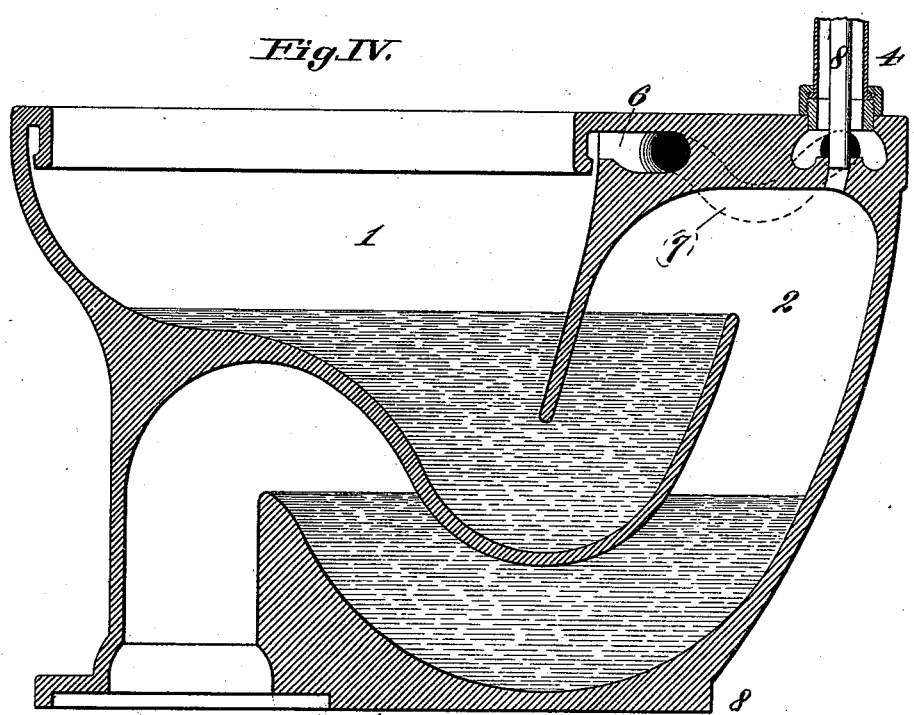
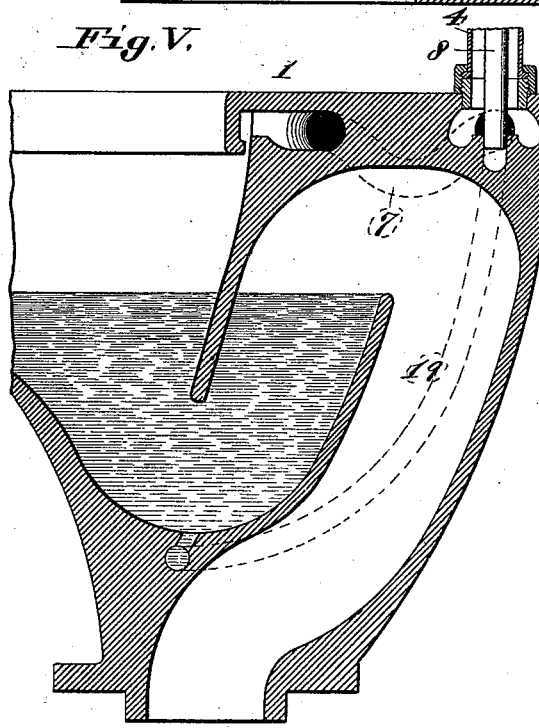
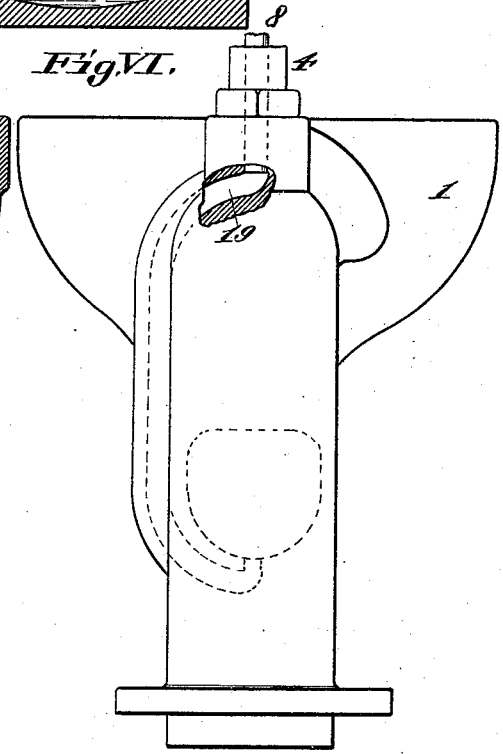
Attest:
E. S. Knight
Benj. A. Knight
Inventor:
Herman C. Stifel
By Knight Bro. attys

UNITED STATES PATENT OFFICE.

HERMAN C. STIFEL, OF ST. LOUIS, MISSOURI, ASSIGNOR TO THE STIFEL-O'NEIL HOME COMFORT CO., OF SAME PLACE.

WATER-CLOSET.

SPECIFICATION forming part of Letters Patent No. 516,131, dated March 6, 1894.

Application filed March 17, 1893. Serial No. 466,484. (No model.)

*To all whom it may concern:*

Be it known that I, HERMAN C. STIFEL, of the city of St Louis, in the State of Missouri, have invented a certain new and useful Improvement in Water-Closets, of which the following is a full, clear, and exact description, reference being had to the accompanying drawings, forming part of this specification.

My invention relates to certain improvements in that class of water closets in which the trap of the bowl has its siphonic action controlled by the mechanism employed for opening a supply of water from the tank and bowl; and my invention consists in features of novelty hereinafter fully described and pointed out in the claims.

Figure I is a vertical section, illustrative of my invention. Fig. II is a detail, vertical section of the mechanism for starting the flow of water from the tank to the bowl, and for forming and breaking the siphon in the trap of the bowl. Fig. III is a horizontal section, taken on line III—III, Fig. II. Fig. IV is a vertical section of the bowl. Fig. V is a detail, vertical section, illustrating a modification; and Fig. VI is an elevation of same.

Referring to the drawings, 1 represents the bowl, having a chamber 2 between the two traps.

3 represents a tank.

4 is the discharge pipe leading from the tank to the bowl, and which has an extension 5 within the tank. The pipe 4 communicates with the hollow rim 6 of the bowl, through means of a trap shaped passage 7, for the purpose of forming a seal.

8 represents a small pipe preferably located within the pipe 4 and communicating with the chamber 2 of the bowl, as shown in Figs. I and IV. This pipe 8 extends into the tank 3, outside of the extension 5 of the pipe 4, as shown in Fig. II.

9 represents a cylinder or box located within the tank and having a chamber 10 receiving the extension 5 of the pipe 4, and a chamber 11 receiving the upper end of the pipe 8. This cylinder or box is adapted to be raised by a lever 12 pivoted at 13, and provided with a pull chain or cord 14. The portion of the cylinder or box forming the chamber 11 is somewhat shorter than the portion of the cylinder or box forming the chamber 10, or what is equivalent of making it shorter, this portion of the cylinder or box may be formed with perforations 15, which is the construction I have shown in the drawings. The cylinder or box is provided on top with bent screws or plugs 16, one for each chamber 10, 11.

The operation of the device is as follows: When the bowl is to be flushed, the cylinder or box is raised from the position shown in Fig. I to the position shown in Fig. II, which starts the siphon, or the flow of water from the tank to the bowl through the pipe 4, and its extension 5, and at the same time an upward current of air from the chamber 2 through the pipe 8 is effected, thus starting the siphon in the bowl, and causing the water to pass out of the upper trap of the bowl, and then a downward flow of water will commence in the pipe 8 from the tank to the chamber 2 of the bowl. When the water in the tank nearly reaches the lower end of the portion of the cylinder or box forming the chamber 10, air enters through the perforations 15, and through the pipe 8 to the chamber 2, thus breaking the siphon in the bowl, and immediately after this air enters the chamber 10, stopping the flow of water from the tank to the bowl, and the water contained in the pipe 4 is sufficient to form the seal in the traps of the bowl. It will be understood that as soon as the cylinder or box 9 is raised, the lever 10 is released, and the cylinder or box descends to its normal position, where it remains until the action is to be repeated.

17 represents the supply pipe of the tank, which is provided with the usual valve and float 18.

In the modification shown in Figs. V and VI, the bowl is provided with but a single trap, and the pipe 8 is extended, as shown by dotted lines 19, to the bottom of the trap of the bowl. In this construction there is no air drawn from the chamber 2 when the box 9 is raised, but after the box 9 is raised, there will be a downward flow of water through the pipe 8 into the lower part of the bowl.

I claim as my invention—

1. In a water closet, the combination of a bowl, a water tank, a discharge pipe connecting the tank to the bowl, and which has an extension within the tank, a small pipe extending from the bowl into the tank, and a cylinder or box having chambers receiving the extension of the discharge pipe, and the upper end of said small pipe, and means for moving the cylinder or box, substantially as and for the purpose set forth.

2. In a water closet, the combination of a bowl having a chamber between its traps, a water tank, a discharge pipe connecting the tank to the bowl, and which has an extension within the tank, a small pipe extending from the chamber of the bowl into the tank, a cylinder or box having chambers receiving the upper ends of said discharge pipe, and said small pipe, and having perforations 15, and means for moving said cylinder or box, substantially as and for the purpose set forth.

3. In a water closet, the combination of a bowl, having a trap shaped passage 7, and a chamber 2, a tank, a discharge pipe connecting the tank to the bowl through means of said passage 7, and which has an extension within the tank, a small pipe extending from the chamber 2 of the bowl through the discharge pipe and into said tank, a box or cylinder having chambers receiving the upper end of the discharge pipe, and said small pipe, and means for moving the box or cylinder; substantially as and for the purpose set forth.

HERMAN C. STIFEL.

In presence of—
   E. S. KNIGHT,
   BENJN. A. KNIGHT.